United States Patent [19]

Gong et al.

[11] Patent Number: 5,145,888

[45] Date of Patent: Sep. 8, 1992

[54] NON ASBESTOS ION-POLYER COMPOSITE FRICTION MATERIALS

[76] Inventors: Ke-Cheng Gong; Yang-Meng Ou, both of Guang Ming Science & Technology, Guang Dong Co., Guangzhou, China; Gregory S. Yeh, 2824 Indian Trail, Pinckney, Mich. 48169

[21] Appl. No.: 427,144

[22] Filed: Oct. 26, 1989

[51] Int. Cl.$^5$ .............................................. C08J 5/14
[52] U.S. Cl. ................................. 523/156; 523/149; 523/150; 523/152; 523/153; 523/155; 523/156; 523/157; 523/205; 524/406; 525/221
[58] Field of Search ............... 523/149, 150, 152, 153, 523/155, 156, 157, 205; 524/406; 525/221

[56] References Cited

U.S. PATENT DOCUMENTS

| | | | |
|---|---|---|---|
| 3,714,102 | 1/1973 | Reiss | 260/29.6 R |
| 3,773,708 | 11/1973 | Takahashi et al. | 260/41 R |
| 3,832,207 | 8/1974 | Machi et al. | 106/308 M |
| 4,374,211 | 2/1983 | Gallagher et al. | 523/156 |
| 4,384,054 | 5/1983 | Moraw et al. | 523/156 |
| 4,403,047 | 9/1983 | Albertson | 523/153 |
| 4,476,256 | 10/1984 | Hamermesh | 523/152 |
| 4,477,605 | 10/1984 | Okubo et al. | 523/155 |
| 4,657,951 | 4/1987 | Takarada et al. | 523/153 |
| 4,672,082 | 6/1987 | Nadagawa et al. | 523/153 |
| 4,722,949 | 2/1988 | Horiguchi et al. | 523/153 |
| 4,853,427 | 8/1989 | Herten et al. | 524/394 |
| 4,866,107 | 9/1989 | Doxsee et al. | 523/153 |
| 4,886,706 | 12/1989 | Rush et al. | 428/288 |
| 4,945,005 | 7/1990 | Aleckner, Jr. et al. | 428/500 |

OTHER PUBLICATIONS

Ou et al., Studies on Properties of a Novel Elevated Temperature Tribocomsites (Abstract), (Nov. 27, 1988), One (1) page.

*Primary Examiner*—Paul R. Michl
*Assistant Examiner*—Edward Cain
*Attorney, Agent, or Firm*—Christopher John Rudy

[57] ABSTRACT

Non-asbestos ion-polymer composite friction materials show high heat resistance and low wear, being especially useful for friction elements in brake shoes or blocks in automobiles and industrial machines. The non-asbestos ion-polymer composites are basically composed of a polyacrylonitrile fiber and an ion-polymer used as binder matrix. An optional friction modifier can be added to include, e.g., carbon, graphite and/or $MoS_2$, etc. The ion-polymer is polymerized from alpha, beta-unsaturated-gamma-carbonyl monomers, e.g., acrylic acid, or esters thereof or their comonomers, directly onto the solid surface of divalent metal compounds, e.g., Ca, Sr, Ba, Zn salt(s) and/or oxide(s).

22 Claims, No Drawings

NON ASBESTOS ION-POLYER COMPOSITE FRICTION MATERIALS

FIELD

This invention concerns an entirely new generation of non-asbestos friction materials, used, e.g., in vehicle brakes, clutches, etc., as well as in industrial machines, e.g., impact forming machines, and so forth and the like, and preparation thereof.

BACKGROUND

Friction materials for brakes, etc., are generally known to be produced by consolidating asbestos as a strength member, inorganic powders such as carbides, oxides, etc., as a friction-increasing member, carbon or graphite and the like as a friction-controlling member in a matrix of an organic resin binder, e.g., phenolics. See e.g., Takarada et al., U.S. Pat. No. 4,657,951 (1987). However, asbestos may well have health disadvantages in production and in use, and, in fact, the phasing out of its use is being encouraged by various authorities.

Numerous attempts have been made to replace asbestos with such materials as steel fiber, Kevlar fiber, cellulose fiber, etc. See e.g., Horiguchi et al., U.S. Pat. No. 4,722,949 (1988); Nakagawa et al., U.S. Pat. No. 4,672,082 (1987); Okubo et al., U.S. Pat. No. 4,477,605 (1984); Hamermesh, U.S. Pat. No. 4,476,256 (1984); Albertson, U.S. Pat. No. 4,403,047 (1983); Moraw et al., U.S. Pat. No. 4,384,054 (1983); Gallagher et al., U.S. Pat. No. 4,374,211 (1983).

However, results from such attempts have not been entirely satisfactory because of cost, handling and/or performance. For instance, a significant problem in the art is that the temperature resistance of the organic resin binder is usually low, typically being not greater than about 325° C. Therefore, in order to bring about substantial improvements in the behavior of friction elements, binders having much higher temperature resistance must be developed. This requirement is more necessary in light of today's markets for high performance and high speed vehicles, to include airplanes, automobiles and trains etc.

Consequently, one of the most challenging tasks in the industry is to develop materials with not only a suitable low cost non-asbestos strength component but also a suitable binder such that their use in the production of friction elements can lead to retention of good friction characteristics at high temperatures. Heretofore, such tasks have been unfulfilled, and the art lacked the provision of these materials.

OBJECTS

A primary object of the present invention was to develop a new generation of friction materials having greatly improved heat resistance and wear resistance. Further significant objects included development of friction materials without disadvantages such as the undesirable phenomenon of brake fading at high temperatures, high cost, etc., that are often associated with friction materials of the known art.

These and other objects are achieved by the present invention.

SUMMARY

This invention provides, in one aspect, a non-asbestos ion-polymer composite friction material comprising a polyacrylonitrile (PAN) fiber and an ion-polymer binder. Another aspect is a procedure to prepare a non-asbestos ion-polymer composite friction material comprising polymerizing at least one alpha, beta-unsaturated-gamma-carbonyl monomer in the presence of a divalent metal compound to prepare a binder matrix, in the presence of, and/or then contacting the binder matrix with, a polyacrylonitrile (PAN) fiber, under conditions sufficient to prepare the composite material. An optional friction modifying component can also be used in some formulations to bring about varying friction characteristics that are desirable in certain applications.

The present invention is useful in providing improvements in friction materials.

This invention is a significant advance in the art in the provision of a novel matrix material and fiber composition which has great heat and wear resistances. Other significant performance factors such as, e.g., the ability of the composite to not fade during braking at much higher temperatures than the known art, are generally characteristic of the composites of this invention. The cost of the composite can be kept very low. The use of asbestos can be eliminated.

The procedural aspects of this invention are significant advances in being simple and efficient. These procedures are readily commercially adaptable. One and multi-step processing can be employed with great advantage.

Further advantages attend this invention as well.

ILLUSTRATIVE DETAIL

Herein, a procedure is a method and/or process.

The non-asbestos fiber component in the composites of the present invention is a polyacrylonitrile (PAN) fiber, especially the pulp form of PAN fiber. The PAN fiber component acts as a high strength component here. PAN fibers in pulp form can be highly fibrillated, with many very fine fibrils attached to the core fibers. The length of the PAN fiber core is desirably about from 2 to 4 mm, with a length to diameter ratio of at least about 200:1.

The binder matrix is an ion-polymer which can be polymerized, in general, from a sample containing alpha, beta-unsaturated-gamma-carbonyl monomers directly onto the solid surface of a sample of a divalent metal compound. The monomer(s) used according to the present invention desirably is (are) alpha, beta-ethylenically unsaturated, and especially include those having the general formula:

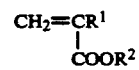

where $R^1$ and $R^2$ can be the same or different, i.e., independently at each occurrence, represent a hydrogen atom or a suitable organic moiety, especially including an aryl or arylalkyl radical having about from 6 to 8 carbon atoms or an alkyl radical having about from 1 to 4 carbon atoms. Examples of the monomer(s) include acrylic acid and/or its esters, and so forth. The divalent metal compound(s) is (are) generally to be powdery, preferably with the average diameter of the particulate to be in the range about from 0.01 to 1.0 μm. The divalent metal compound(s) employed can be a salt and/or oxide. According to the present invention, the powdery divalent metal compound(s), used as carrier(s) crosslinker(s), and or filler(s), desirably include particulate Ca, Sr, Ba, Zn carbonate(s), sulfates, halogenide(s) and/or oxides(s). The type of surface and the surface area of the particulates may play an important role in the polymerization.

Optional friction modifying component(s) can be added. For example, carbon, graphite and/or $MoS_2$, and so forth and the like particles can be added. Advantageously, the friction modifier contains the carbon or graphite in the form of particles, especially those of at most generally about 300 mesh size.

The preparation procedure for the ion-polymer binder is generally as follows.

First, the monomer(s) and divalent metal compound(s) are mixed in an aqueous or other solvent system as in typical suspension systems. A polymerization initiator is mixed into the monomer phase, the type of initiator being dependent on the type of monomers used. For water soluble or partially water-soluble monomers, ammonium persulfate or hydrogen peroxide is desirably applied in the invention. The concentration of the divalent metal compound(s) depends on the kind of monomers or comonomers, the kind of initiators and the kind of solvent used. Generally, the concentration of the divalent metal compound in the polymerization system is desirably about from 10 to 50 percent by weight, and the ratio of monomer(s) (or comonomer(s)) to divalent metal compound(s) is about from 95:5 to 1:9 by weight. In general, polymerization is carried out by appropriate choice of reaction parameters and conditions to effect the desired stage of progress. This polymerization can be carried out if desired in the presence of additional component(s), e.g., PAN fiber, friction modifier, and so forth. Further, polymerization can be carried out prior to addition of the additional component(s).

The final formulation of the non-asbestos ion-polymer composite friction materials, in general, is desirably in the range of about from 5 to 55 percent by weight for the PAN fiber, about from 20 to 90 percent by weight for the ion-polymer binder, and about from 0 to 40 percent by weight for the optional friction modifier component. Other formulations are possible also, of course.

In general, in a typical processing procedure, various amounts of ingredients are mixed together to form a homogeneous mixture. In a two-step procedure, useful in certain applications, the mixture is first pressed into preforms of the composite of the invention under suitable conditions, e.g., at a temperature about from 20° to 150° C., a pressure about from 100 to 1000 kgf/cm² and for times at least about 10 seconds. These preforms typically have excellent handling properties, retaining their structural integrity when being transported from one place to another. The preforms can be then transferred to a second press where further processing under appropriate conditions, e.g., a pressure of about from 100 to 10,000 kgf/cm² and a temperature of about from 20° to 360° C., are applied for times of at least about from 10 seconds. In cases where one-stage processing operations are preferred, parts such as brake lining pads or discs can be made by a vacuum-vilsofletation (application of simultaneous vacuum and vibration) compression molding press under suitable conditions, e.g., at a temperature about from 20° to 360° C., a pressure about from 100 to 10,000 kgf/cm² and for times of at least about 10 minutes. In both procedures, times up to several hours, weeks or even months under appropriate processing conditions can be employed as may be desirable.

Using the above processing procedure(s), and the composition according to the present invention, the resultant composite friction elements can exhibit excellent physical properties. For example, the friction composite can generally have Rockwell hardness values about from HRF 70 to HRF 110, compressive strengths about from 1000 to 1800 kgf/cm² and excellent temperature resistance up to at least about 400° C., and even up to about 550° C.

The following example further illustrates the present invention. Therein, parts and percentages are by weight.

EXAMPLE

Preparation of the ion-polymer was carried out in a typical glass reaction vessel. A uniform reaction mixture was formed by stirring 400 parts of distilled water, 20 parts of acrylic acid, 100 parts of calcium carbonate powder, with an average diameter of 0.453 μm and purity of 98 percent and 1 part of ammonium persulfate. The mixture was heated under agitation at 70° C. for 4 hours to effect the polymerization and then filtered and dried at 80° C. The product of the ion-polymer, here being polycalcium acrylate, was extracted with alcohol/water (4:1) as solvent at 90° C. overnight, or about 12 hours, and then dried again at 80° C. to yield 119.26 parts of a clear, white powder with a density in the range 1.52–1.54 g/cm³.

Preparation of the friction material composite was carried out using a homogeneous mixture of 87 parts of the ion-polymer powder as prepared above, 10 parts of highly fibrillated PAN fiber, 2–4 mm, in its pulp form, and 3 parts of graphite powder (≦300 mesh). This uniform mixture was shaped and molded in a vacuum-vilsofletation press, using the one-step process, at 200° C. under a pressure of 4000 kgf/cm² for five hours. The molded samples had a Rockwell hardness reading of HRF 90, a compressive strength of 1500 kgf/cm², an average density reading of 1.75 g/cm³ and show temperature resistance up to 480° C. without any observed alterations in physical or chemical properties.

The above prepared ion-polymer composite was tested for friction coefficient and wear as a function of temperature according to the procedure as prescribed in JIS D4411 (equivalent to SAE J998). The results are shown in Table 1.

TABLE 1

| | Temperature, °C. | Non-Asbestos Ion-Polymer Composite |
|---|---|---|
| Coefficient of Friction, μ | 100 | 0.45 |
| | 150 | 0.45 |
| | 200 | 0.42 |
| | 250 | 0.42 |
| | 300 | 0.42 |
| | 350 | 0.41 |
| Wear, Δν $10^{-7}$ cm³/kgf · m | 100 | 0.95 |
| | 150 | 0.90 |
| | 200 | 1.41 |
| | 250 | 1.27 |
| | 300 | 1.91 |
| | 350 | 3.18 |

As seen from Table 1, the non-asbestos composite of this invention shows most excellent results in both the coefficient of friction, μ, and the amount of wear, Δν. The values of remain essentially free from the undesirable phenomena of fading at high temperatures, and the wear rates are also astoundingly low, especially at high temperatures.

Furthermore, the amount of total wear in actual use was extremely low. It was measured to be less than about 2 mm in the test brake linings installed in a typical passenger car after operating the linings for about 50,000 miles (80,000 km) at an average speed of about 50 mph (80 km/h), the test brake linings being made of the same material prepared and laboratory tested as described in this example of the present invention.

CONCLUSION

The present invention is thus provided. Numerous adaptations and modification can be effected by those skilled in the art within the spirit of this invention, the scope of which is particularly pointed out by the following distinctly claimed subject matter.

What is claimed is:

1. A non-asbestos ion-polymer composite friction material comprising a polyacrylonitrile (PAN) fiber and an ion-polymer binder matrix polymerized together with a divalent metal compound.

2. The composite of claim 1 wherein a friction modifier is present.

3. The composite of claim 2 wherein the friction modifier is a carbonaceous particulate and/or $MoS_2$.

4. The composite of claim 1, 2 or 3 wherein the PAN fiber is in pulp form and is highly fibrillated with many fine fibrils or subfibrils attached to the core fiber thereof.

5. The composite of claim 4 wherein the length of the PAN fiber core is about from 2 to 4 mm, with a ratio of length to diameter of at least about 200:1.

6. The composite of claim 1 wherein the ion-polymer binder is polymerized to include from at least one monomer of the general formula:

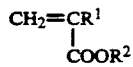

in which $R^1$ and $R^2$ independently at each occurrence represent a hydrogen atom, an aryl or arylalkyl radical having about from 6 to 8 carbon atoms or an alkyl radical having about from 1 to 4 carbon atoms, or their comonomers, on the surface of at least one particulate divalent metal compound of Ca, Sr, Ba or Zn carbonate, sulfate, halogenide and/or oxide, in the size range about from 0.01 to 1.0 μm.

7. The composite of claim 6 wherein the ion-polymer binder is polymerized in a suspension system.

8. The composite of claim 7 wherein the ion-polymer binder is polymerized employing a concentration of the divalent metal compound(s) about from 10 to 50 percent by weight of all suspension systems, and the ratio of monomer(s) or comonomer(s) to divalent compound(s) is about from 95:5 to 1:9 by weight.

9. The composite of claim 1, 2 or 3 wherein the PAN fiber is present in an amount about from 5 to 55 percent by weight of all materials, the ion-polymer binder is present in an amount about from 20 to 90 percent by weight of all materials, and the friction modifier is at a level of about from 0 to 40 percent by weight of all materials.

10. The composite of claim 1 wherein the composite is provided in a formed piece obtained by either a 2-step processing operation using preforms or a 1-step processing operation using a vacuum-vilsofletation procedure.

11. The composite of claim 10 wherein for the 2-step process a temperature about from 20° to 360° C., a pressure about from 100 to 10,000 $kgf/cm^2$ and a time about from 10 seconds to several months are employed, and in the 1-step operation, a temperature about from 20° to 360° C., a pressure about from 100 to 10,000 $kgf/cm^2$ and times about from 10 minutes to several months are employed.

12. The composites of claim 10 wherein the 2-step processing operation is employed, and the preform-process thereof is operated at a temperature about from 20° to 300° C., at a pressure about from 10 to 1000 $kgf/cm^2$ and for a time of at least about 10 seconds.

13. The composite of claim 1 wherein the resultant product has physical properties of a Rockwell hardness about from 70 to 110 HRF, a compression strength about from 1000 to 1800 $kgf/cm^2$ and a resistance to temperature of at least about 400° C. without substantial alterations in its physical properties.

14. A procedure to prepare an ion-polymer material comprising polymerizing at least one alpha, beta-unsaturated-gamma-carbonyl monomer in the presence of a divalent metal compound under conditions sufficient to prepare the ion-polymer material.

15. A non-asbestos friction material comprising an ion-polymer binder matrix polymerized together with a divalent metal compound, wherein said material has at least one of the following properties: a Rockwell hardness value of at least about HRF 70; a compressive strength of at least about 1000 kgf per square centimeter: an excellent temperature resistance up to at least 400 degrees C.

16. The material of claim 15, wherein the ion-polymer binder matrix is polymerized to include residues from at least one monomer of the general formula:

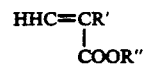

in which R' and R" independently at each occurrence represent a hydrogen atom, an aryl or arylalkyl radical having about from 6 to 8 carbon atoms, or an alkyl radical having about from 1 to 4 carbon atoms, or comonomer(s) therewith, on the surface of at least one particulate divalent metal compound of Ca, Sr, Ba, or Zn carbonate, sulfate, halogenide and/or oxide, in the size range about from 0.01 to 1 um.

17. The material of claim 16, wherein the ion-polymer binder is polymerized in a suspension system.

18. The material of claim 17, wherein the ion-polymer binder is polymerized employing a concentration of the divalent metal compound(s) about from 10 to 50 percent by weight of all suspension systems, and the ratio of monomer(s) or comonomer(s) the divalent metal compound(s) is about from 95:5 to 1:9 by weight.

19. The material of claim 18, wherein the polymerization of obtained ion-polymer binder is carried out in the presence of at least one additional component, and further, the polymerization is carried out prior to addition of the additional component(s).

20. The material of claim 19, wherein the final formulation is about from 20 to 90 percent by weight ion-polymer binder, about from 5 to 55 percent by weight PAN or the like fiber, and about from 0 to 40 percent by weight of a friction modifier.

21. The procedure of claim 14, wherein said polymerizing is carried out in the presence of, and/or the ionpolymer material is then contacted with, a polyacrylonitrile (PAN) fiber, under conditions sufficient to prepare a composite material.

22. The procedure of claim 21, wherein said composite material is a non-asbestos composite friction material.

* * * * *